Figure 1:
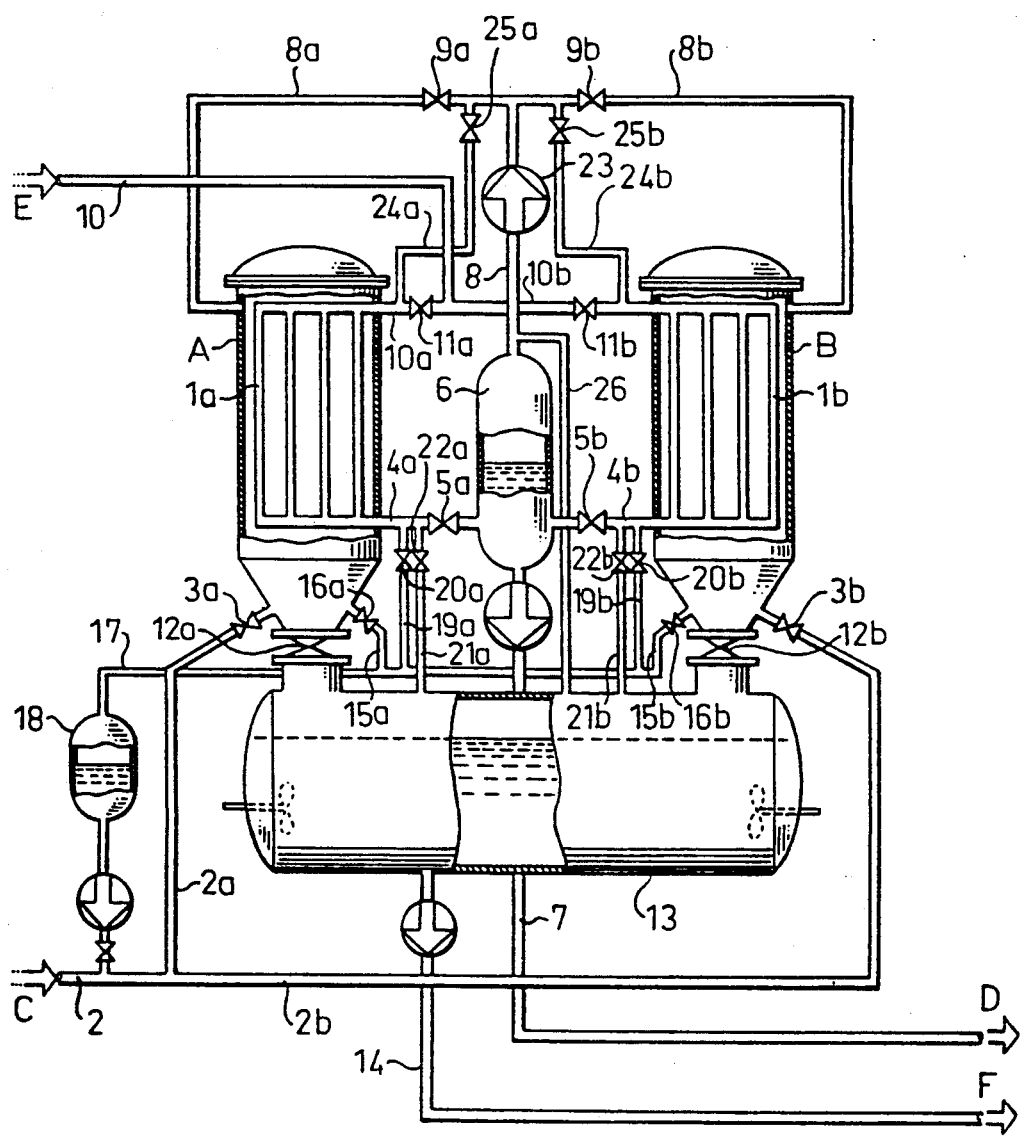

United States Patent [19]

Strid et al.

[11] Patent Number: 5,149,449
[45] Date of Patent: Sep. 22, 1992

[54] METHOD AND DEVICE FOR FILTURING OF SUSPENSIONS

[76] Inventors: Kent Strid, Svadenvägen 11, S-810 28 Järbo; Rolf Oswaldsson, Skyttestigen 10B, S-803 36 Gävle, both of Sweden

[21] Appl. No.: 689,766
[22] PCT Filed: Oct. 4, 1990
[86] PCT No.: PCT/SE90/00639
§ 371 Date: May 30, 1991
§ 102(e) Date: May 30, 1991
[87] PCT Pub. No.: WO91/04778
PCT Pub. Date: Apr. 18, 1991

[30] Foreign Application Priority Data
Oct. 4, 1989 [SE] Sweden .................. 8903267

[51] Int. Cl.$^5$ ............................................. B01D 29/62
[52] U.S. Cl. ........................ 210/798; 210/167; 210/188; 210/253; 210/257.1; 210/258; 210/332; 210/333.01; 210/340; 210/346; 210/411; 210/486; 210/771; 210/772; 210/797
[58] Field of Search ............... 210/767, 770, 771, 772, 210/797, 798, 188, 190, 191, 253, 257.1, 258, 332, 333.01, 340, 346, 411, 486, 487, 108, 323.2, 333.1, 167

[56] References Cited

U.S. PATENT DOCUMENTS

| | | | |
|---|---|---|---|
| 4,217,700 | 8/1980 | Müller | 210/771 |
| 4,358,383 | 11/1982 | Asp | 210/797 |
| 4,405,466 | 9/1983 | Giannelli et al. | 210/798 |
| 4,855,057 | 8/1989 | Ohnishi et al. | 210/797 |
| 4,874,533 | 10/1989 | Boze et al. | 210/798 |
| 4,923,068 | 5/1990 | Crowson | 210/333.01 |
| 5,053,141 | 10/1991 | Laiho | 210/797 |
| 5,062,968 | 11/1991 | Warning | 210/771 |
| 5,074,999 | 12/1991 | Drori | 210/333.01 |
| 5,085,997 | 2/1992 | Müller | 210/798 |

FOREIGN PATENT DOCUMENTS

| | | |
|---|---|---|
| 8100058 | 1/1981 | PCT Int'l Appl. . |
| 8905184 | 6/1989 | PCT Int'l Appl. . |
| 435681 | 10/1984 | Sweden . |
| 423723 | 5/1967 | Switzerland . |

Primary Examiner—Robert A. Dawson
Assistant Examiner—Sun Uk Kim
Attorney, Agent, or Firm—Quarles & Brady

[57] ABSTRACT

In a method for filtering a suspension through a stationary filter having a vertical filter element arranged in a pressure vessel and for re-conditioning the filter after filtering, the filtrate is discharged from the bottom of the filter element during the main part of the filtering. After filtering, unfiltered suspension is discharged in a known manner from the pressure vessel later to be returned to the suspension inlet. Thereafter, back-wash is performed with another medium other than filtrate, an outlet for material deposited on the filter element being opened for removal of said material together with the back-washing medium. Preferably, before back-wash, drying of the material deposited on the filter element takes place by means of a gas medium circulating within the filtering plant.

31 Claims, 3 Drawing Sheets

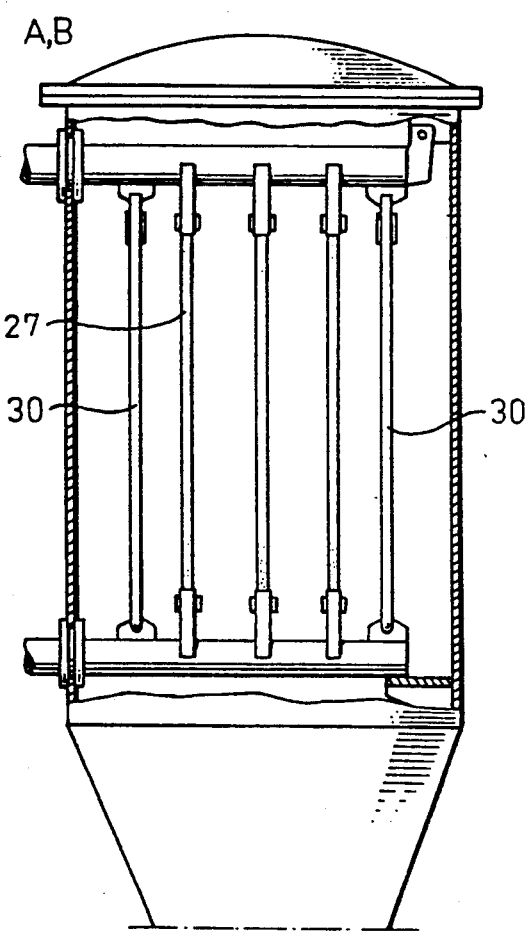
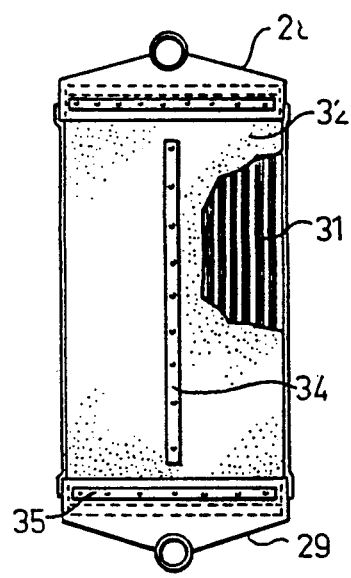
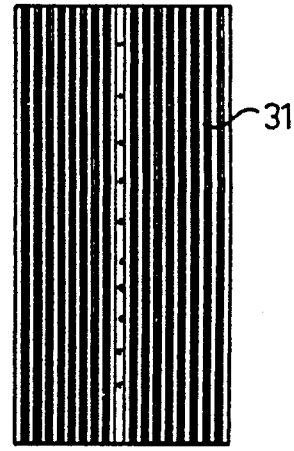
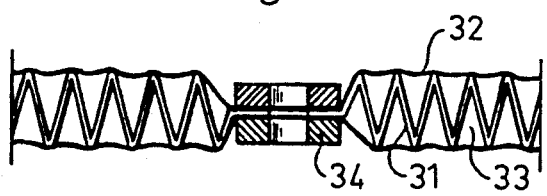
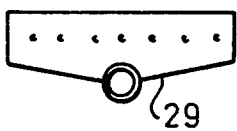

METHOD AND DEVICE FOR FILTURING OF SUSPENSIONS

The present invention concerns a method for filtering a suspension, e.g. filtering for separating liquor and lime sludge in a causticising process, and a device for performing the method.

For performing the filtration a stationary filter is used being arranged in a pressure vessel, and after each filtration a re-conditioning of the filter is made including back-washing the filter before start of the next filtration. The filtering takes place through at least one substantially vertically arranged filter element covered with filter cloth surrounding at least one filter channel through which flows filtrate obtained during filtration, for instance white liquor or green liquor, while filtered material, for instance lime sludge, is deposited on the filter cloth. The pressure vessel is provided with at least inlet means for the suspension to be filtered, outlet means for filtrate obtained during filtration, outlet means for material obtained during filtration, and inlet means for media for re-conditioning the filter.

According to prior art utilizing a stationary filter, separation of white liquor and lime sludge in a causticising process is performed in a so called tube filter, i.e. depending perforated tubes covered with filter cloth which have their filter outlets directed upwards. This tube filter is divided in separate parts having separate white liquor outlets from each part. While parts of the tube filter are back-washed, which takes place with liquid already filtered, i.e. white liquor, filtering takes place in the other parts. This involves, a.o., a bad ratio of utilization of the filter. Further, during the entire process a continuous discharge of material removed by the back-washing, i.e., lime sludge, takes place from the pressure vessel. This brings about a.o. the drawback, that the lime sludge gets a great content of unfiltered liquid including a large content of chemicals.

The object of the present invention is to provide a new and efficient method and an improved device for filtering a suspension. This has been achieved by the method stated in claims 1–18 and the device stated in claims 19–32.

The drawbacks mentioned above have widely been eliminated by the method according to the present invention. By discharging filtrate from the bottom of the filter it is assured that the filter elements are emptied of filtrate when back-washing takes place. Further, since back-washing according to the present invention is made with another medium than filtrate, preferably water, it is achieved that material removed from the filter cloth is not mixed with a washing medium having a large content of chemicals, as is the case when filtrate is used as back-wash liquid. At the same time a dilution of the removed filter cake is obtained already in the filtering vessel which in turn results in that the mixture of washing liquid and removed filter cake self-drains out through an outlet provided for this purpose without any need for a scraper mechanism or other emptying means. In the drying step, preferably taking place before the back-wash, a gas medium is preferably used which is circulating at least between the pressure vessel and a separator for separating the gas medium from the filtrate, but preferably also between a tank for collecting filter cake and washing medium. By circulating the gas medium, mainly air and water vapour, is achieved that the oxygen contents of the gas medium is so low that oxidation of the filtrate is avoided. In all, in improved filtering result having high capacity and efficiency is obtained with a method according to the invention as compared to the prior art.

Figure 6:
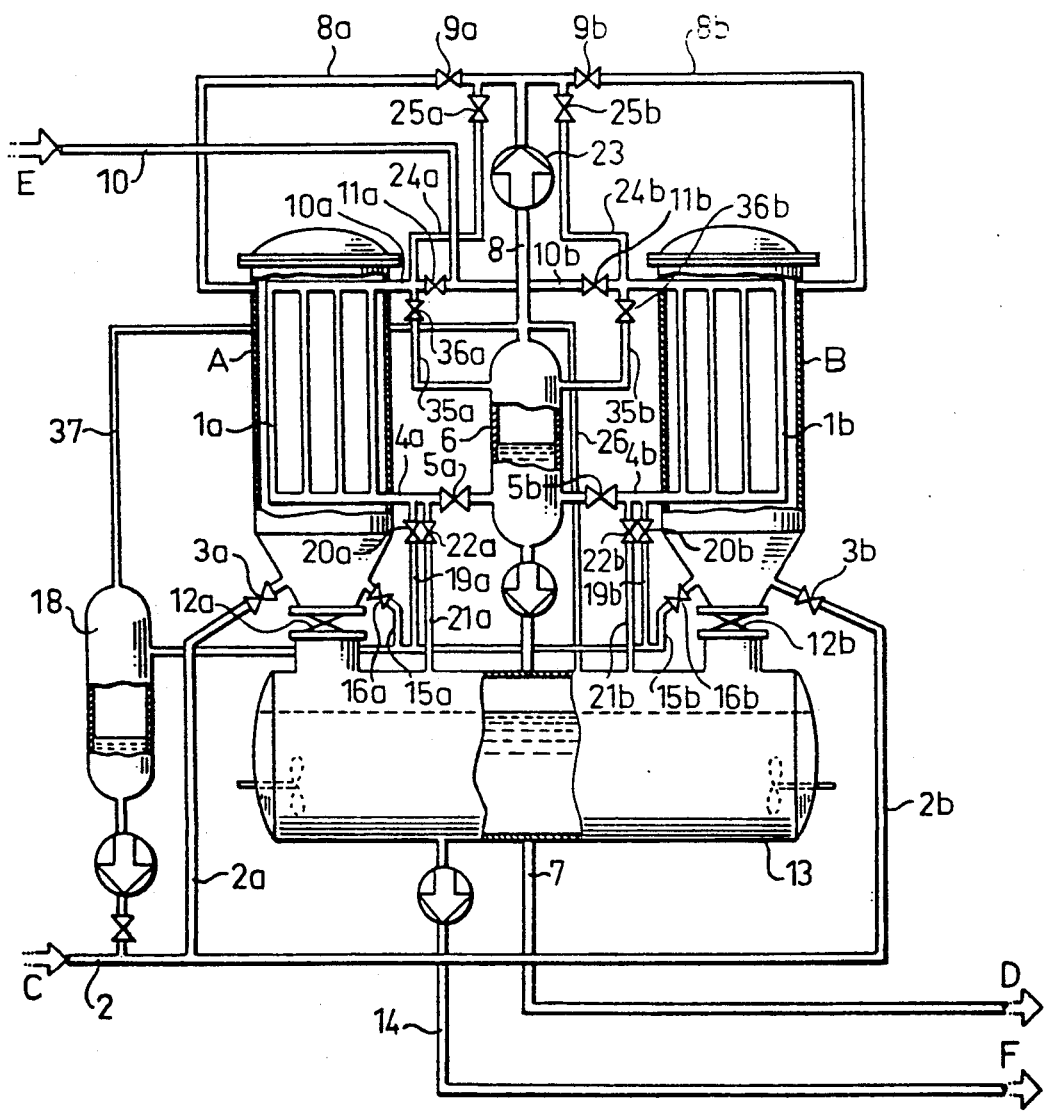

A method according to the invention enables in a simple manner a continuous filtering and re-conditioning cycle in a unit including at least two pressure vessels. According to the present invention, while the filtering process according to the above proceeds in one pressure vessel the re-conditioning process as stated above is performed in the other pressure vessel. The invention enables in an advantageous manner common sources for feeding the suspension and discharging the filtrate, a common source for the gas medium for drying the material on the filter cloth, a common source for media for back wash, and a common source for the material taken from the filter element. Further features and advantages of the present invention will be apparent from the following description of an embodying example, reference being made to the accompanying drawings, wherein FIG. 1 shows an example of a filtering unit including two pressure vessels in which filters are arranged, FIG. 2 shows more in detail an embodiment of a filter comprising a plurality of filter elements, FIG. 3 is a side view of one of the filter elements, FIG. 4 is a section at an enlarged scale through the filter element according to FIG. 3, FIG. 5 shows a filter element according to FIG. 3 in a disassembled state and without a surrounding filter cloth, and FIG. 6 shows a development of the filtering unit shown in FIG. 1.

In the following embodying example the invention will, for a simplifying reason, be referred to one field of use, viz., filtering of liquor suspension in a causticising process and specifically white liquor and lime sludge. It should be appreciated however that also filtering of other suspensions and within other fields are within the scope of the invention.

In the filtering unit shown in FIG. 1 are arranged two pressure vessels A and B in which are arranged stationary filters 1a, 1b, respectively. As appears from the figure the pressure vessels are equally shaped and provided with the same surrounding equipment. Therefore, corresponding details of the two pressure vessels have been given the same reference numerals, the reference numerals for details concerning vessel A being followed by "a" and for details concerning vessel B being followed by "b".

In the following description it is assumed that filtering of white liquor and lime sludge takes place in one vessel, for instance vessel A having filter 1a, and that re-conditioning of filter 1b in vessel B takes place after finished filtering in this vessel. Filtering in one vessel suitably can take place while re-conditioning of the filter in the other vessel takes place. Thus, each vessel works discontinuously with alternating filtering and re-conditioning, whereas, by means of a unit as the one shown in FIG. 1 having at least two pressure vessels, a continuously working filtering unit is enabled.

It should be observed however, that the present invention includes the use of only one discontinuously working pressure vessel and that the filtering process only as well as the re-conditioning process only involve novelty and substantial advantages compared to the prior art.

The filters 1a and 1b are only schematically shown in FIG. 1, while in FIGS. 2-5 is shown a suitable embodiment of the filters which will be closer described hereinafter. However, the filters are generally of a kind comprising at least one substantially vertical filter element covered with filter cloth surrounding at least one filter channel. At filtering the filtrate (white liquor) is pressed through the filter cloth and flows downwards to the bottom of the filter, while filtered material (lime sludge) deposits on the filter cloth and builds up a layer thereon. After having reached a certain pressure difference over the filter cloth and the lime sludge layer, the filtering process is discontinued and the lime sludge layer is removed from the filter cloth during the re-conditioning process.

Turning back to the filtering unit shown in FIG. 1, assuming that the suspension comprises white liquor and lime sludge, arrow C shows feeding thereof through conduit 2 which branches into conduit 2a to vessel A and 2b to vessel B. In conduits 2a and 2b are inserted valves 3a, 3b respectively. From the bottoms of filters 1a and 1b filtrate conduits 4a, 4b, respectively, having valves 5a, 5b, respectively, lead to a filtrate separator 6 for separating filtrate, white liquor and the gas (air or air-vapor-mixture) brought by the white liquor to the separator 6. The white liquor is discharged from the separator through outlet conduit 7 out of the filtering unit (arrow D) and the gas is brought from the separator through conduit 8 including a compressor 23 either through branch conduit 8a having valve 9a back to vessel A or through branch conduit 8b having valve 9b back to vessel B to be used during the re-conditioning process. Thus, the gas is circulating in a closed system bringing about the advantage that oxidation of white liquor is avoided since the contents of oxygen of the gas is mainly consumed. For the re-conditioning process is also arranged a feeding conduit 10 (arrow E) for back-wash liquid (water) either to vessel A through branch conduit 10a having valve 11a or to vessel B through branch conduit 10b having valve 11b. The lime sludge removed during the re-conditioning process is discharged from the bottom of vessel A through valve 12a and from the bottom of vessel B through valve 12b, and the lime sludge is discharged to a tank 13, for instance a so called lime sludge stirring work, common to both vessels. As will be closer described hereinafter the lime sludge is suitably mixed with a back-wash liquid before discharge from the pressure vessels, and lime sludge diluted with back-wash liquid is discharged out of the filtering unit through conduit 14 (arrow F). The filtering unit shown also includes drainage conduits 15a and 15b from the respective pressure vessel having a valve 16a, 16b, respectively, said drainage conduits leading to a return conduit 17 which, through a pump well 18, leads to the feeding conduit 2 for the white liquor lime sludge suspension. Further, from a point before valve 5a a conduit 19a having a valve 20a leads from filtrate conduit 4a to return conduit 17, and in a corresponding manner a conduit 19b having a valve 20b is arranged between filtrate conduit 4b and return conduit 17. Further, from a point before valve 5a a conduit 21a having a valve 22a leads from filtrate conduit 4a to tank 13 and in a corresponding manner a conduit 21b having a valve 22b. Further, between gas conduit 8 of separator 6 and tank 13 is arranged a conduit 26. Finally, between air branch conduit 8a and water branch conduit 10a between points before valve 9a and after valve 11a is arranged a conduit 24a having a valve 25a, and in a corresponding manner a conduit 24b having a valve 25b is arranged between a air branch conduit 8b and water branch conduit 10b.

The purpose of arranging the different conduits and valves will now be closer described in connection with the functional description of a filtering process in pressure vessel A and a re-conditioning process in pressure vessel B.

Before start of the filtering process lime sludge deposited on the filter cloth during a previous filtration has been removed from vessel A and the vessel has substantially entirely been drained from white liquor lime sludge suspension remaining from the previous filtration. When starting the filtration valve 3b is closed and the white liquor lime sludge suspension is fed into a vessel A through conduit 2a and open valve 3a. During a short initial phase filtrate valve 5a is kept closed while valve 20a is open. The purpose hereof is to discharge the first white liquor penetrating through the filter cloth back to the incoming white liquor lime sludge suspension, and this takes place through conduits 19a and 17. Thereafter valve 20a is closed and filtrate valve 5a is opened, suitably just before closure of valve 20a, and is kept open during the entire filtering process. All remaining valves connected to vessel A are kept closed, i.e. valves 9a, 11a, 12a, 16a, 22a and 25a. Thus, during the filtering process itself only valve 3a for feeding the white liquor lime sludge suspension and valve 5a for discharging white liquor are open. Filtering preferably takes place with the entire filter 1a submerged in the suspension whereby the entire filter is used for filtering, and filtering proceeds until an adapted pressure difference over the filter element is obtained. Suitably, this pressure difference is at least principally defined by the pressure of the incoming white liquor lime sludge suspension. It may also, however, at least to a certain degree, be determined by a vacuum within the filter or a level difference between the separator 6 and the filter. The white liquor is discharged as previously mentioned through conduit 7 from separator 6.

In pressure vessel B the filtering has terminated after the above mentioned adapted pressure difference has been reached, and vessel B shall now be re-conditioned for renewed filtering as stated above for vessel A. At termination of the filtering process in vessel B, in a corresponding manner as described above for vessel A, valve 3b and 5b are open and valves 9b, 11b, 12b, 16b, 22b and 25b are closed. When starting the re-conditioning process valve 3b is closed. Valve 9b is opened and an air-vapour mixture is introduced from separator 6 via conduit 8 having compressor 23 and conduit 8b to the inner of the vessel to dry the lime sludge deposited on the filter cloth, whereby the lime sludge is further relieved from white liquor and, thus, also from chemicals. Just after the valve 9b has been opened, valve 16b is opened to discharge from the vessel unfiltered white liquor lime sludge suspension which is returned through conduit 17 to the incoming white liquor lime sludge suspension.

After performed drying of the lime sludge layer drainage valve 16b is closed and soon thereafter filtrate valve 5b and air valve 9b. Now valve 11b is opened for back-washing of the lime sludge layer with back-wash liquid (water) from conduit 10, 10b communicating with the filtrate channels of the filter. Suitably, back-wash liquid is supplied in such an amount that the lime sludge becomes self-draining so that the diluted lime sludge can self-flow down into tank 13 through valve 12b, which is opened just after valve 11b has been opened. Thereafter, valve 11b is closed and soon after that valve 12b. During a short while thereafter valve 22b is opened for drainage of diluting liquid in the filter through conduit 21b down to tank 13. Vessel B is now prepared for filtering. Concerning drying of the lime sludge layer an adapted difference pressure of the filter elements is obtained by means of the compressor 23. It is to be observed that filtering, drying, back-wash and diluting can be regulated entirely independent of each other. Regulating one of these processes, thus, does not affect the others, at least not when two vessels are arranged as shown in FIG. 1.

Control of the valves for a correct timely opening and closing can take place by any conventional control system.

With reference to FIG. 1 has been described above a filtering unit comprising two filter vessels, whereby entirely or at least partly depending on overlapping between a filtering process in one filter vessel and a re-conditioning process in the other filter vessel is obtained a continuously working filtering unit. Of course, the unit may comprise more filtering vessels. It should be observed however, that the invention includes the use of one filter vessel alone which works discontinuously with alternating filtering and re-conditioning. One single such filter vessel with its surrounding equipment and in an embodiment as described in FIG. 1 is obtained if for instance vessel B and its connections are removed from FIG. 1. Further shall be observed the substantial existing novelties concerning the filtering process alone as well as the re-conditioning process alone, namely, as concerns the filtering process, firstly that during this process there is only feeding of suspension and discharge of filtrate, while all remaining connections to the pressure vessel are closed, and that filtering takes place all over the filter, and, concerning the re-conditioning process, that drying of material deposited on the filter cloth takes place within the pressure vessel before the material is removed from the filter cloth. Advantageous is also that back-washing can be performed with sufficient dilution of the material to achieve a condition of self drainage of the diluted material from the pressure vessel.

As concerns back-wash, this may, although not shown in FIG. 1 be performed with a combination of gas and liquid or with only gas. It is, for instance, possible to provide a spraying device above the filter.

An example of a suitable filter to be used in connection with the present invention is shown in FIG. 2-5. In FIG. 2 is shown a pressure vessel, for instance a pressure vessel A, which includes a plurality of filter elements 27, of which one is shown in FIG. 4. The filter element is kept together between gables 28 and 29 by means of pull rods 30. In FIG. 3 is shown a section through a filter element and as shown it comprises a folded plate 31 surrounded by filter cloth 32. Between the filter cloth 32 and plate 31 are formed filtrate channels 33. Particularly if a filter element is relatively wide it is suitable to provide a central clamping frame 34 for tightening the cloth and for parting the filter surface. In FIG. 5 is illustrated the simplicity of disassembling the filter element and to change filter cloth.

Of course, FIGS. 2–5 show only an embodying example of a filter suitable to be used in connection with the present invention.

The embodiment of a filtering unit shown in FIG. 6 differs from the one shown in FIG. 1 primarily in that filtrate outlets are provided also at the top of filters 1a and 1b. In practice, to conduits 10a, 10b between filters 1a, 1b and valves 11a, 11b are connected conduits 35a, 35b respectively, leading to the filtrate separator 6. In conduits 35a, 35b are provided valves 36a, 36b, respectively. In the embodiment of FIG. 6 the pump well 18—apart from the connection with conduit 17—is connected to conduit 8 between the separator 6 and the compressor 23 by means of a conduit 37. Hereby is obtained a more complete circuit for the gas medium circulating in the plant. Discharge of filtrate through conduits 35a, 35b is utilized primarily in the beginning of the filtering process in order thereby to avoid the problem which may arise when filtrate discharge takes place only through conduits 4a, 4b, namely that the filter cake becomes substantially thicker in the lower part of the filter than in the upper part thereof.

We claim:

1. A method for filtering a suspension in a filtering apparatus having a pressure vessel, said pressure vessel having a stationary filter therein, and for re-conditioning said filter after performing filtration therethrough, said filter comprising at least one substantially vertical filter element covered with filter medium, on the outside of which material is deposited during filtration while filtrate flowing through said filter medium is discharged through at least one filtrate channel on the inside of said filter medium, said pressure vessel being provided with suspension inlet means for suspension to be filtered, unfiltered suspension outlet means for unfiltered suspension, filtrate outlet means for said filtrate, deposit outlet means for material deposited on said filter medium and back-wash inlet means for at least one washing medium for back-wash said filter element from said filtrate channel through said filter medium to said pressure vessel, and gas inlet means for a gas medium; said method including the steps of:
   (a) feeding said suspension through said suspension inlet means and discharging said filtrate through said filtrate outlet means only during filtration, while keeping remaining inlets and outlets closed;
   (b) supplying said filtrate to a separator for separating filtrate and gas medium brought along therewith;
   (c) interrupting feeding of said suspension after filtration and discharging unfiltered suspension from said pressure vessel through said unfiltered suspension outlet means to return said unfiltered suspension to said suspension inlet means;
   (d) in connection with said discharge of unfiltered suspension, introducing said gas medium into said pressure vessel for drying of said material deposited on said filter medium during filtration and for displacement of said filtrate out of said filter element and said filter outlet means to said separator; and
   (e) performing back-wash with a washing medium other than filtrate and opening said deposit outlet means for said material deposited on said filter medium for removal thereof together with said washing medium.

2. The method according to claim 1, wherein discharge of said filtrate continues during at least a substantial portion of said drying step.

3. The method according to claim 1, wherein back-wash is performed with only liquid.

4. The method according to claim 3, wherein back-wash is performed with an amount of said washing medium enabling for self drainage of said material through said deposit outlet means for material deposited on the filter medium.

5. The method according to claim 1, wherein backwash is performed with liquid as well as gaseous medium.

6. The method according to claim 1, wherein discharge of unfiltered suspension is approximately total.

7. The method according to claim 1, wherein filtrate obtained at start of filtration is discharged from said filtrate channel at an upper end of said filter.

8. The method according to claim 1, wherein filtrate first obtained at start of filtration is returned to said suspension inlet means.

9. The method according to claim 1 for achieving a continuous filtering and re-conditioning process in one unit including at least two pressure vessels, wherein said filtering process takes place in one pressure vessel and the reconditioning process takes place in the other pressure vessel.

10. The method according to claim 9, wherein said suspension is supplied to said pressure vessels from the same source and said filtrate is discharged from said pressure vessels to a common filtrate separator for separating filtrate and gas medium.

11. The method according to claim 10, wherein said gas medium for drying of said material on said filter medium is obtained from said common filtrate separator.

12. The method according to claim 9, wherein said washing medium is supplied to said pressure vessels from a source common to both vessels.

13. The method according to claim 9, wherein said material removed from said filter element is discharged to a tank common to said pressure vessels.

14. The method according to claim 9, wherein the steps of feeding said suspension and discharging said filtrate, drying and back-washing are controlled independently of each other.

15. The method according to claim 1, wherein said gas medium for drying is taken from said separator.

16. The method according to claim 1, wherein said gas medium is circulated in a closed system including said pressure vessel and said separator.

17. The method according to claim 1, wherein said gas medium before being fed to said pressure vessel is given a pressurized rise defining a pressure difference over said filter element during said drying step.

18. A device for filtering a suspension through a pressure vessel, said pressure vessel having a stationary filter, and for re-conditioning said filter after filtration, said filter comprising at least one substantially vertical filter element covered with filter medium on the outside of which material is deposited during filtration while filtrate flowing through said filter medium is discharged through at least one filtrate channel on the inside of said filter medium, said pressure vessel being provided with at least suspension inlet means for said suspension to be filtered, a first filtrate outlet means connected to the lower end of said filtrate channel and a second filtrate outlet means connected to the upper end of said filtrate channel.

19. The device according to claim 18, wherein said first filtrate outlet leads to a tank.

20. The device according to claim 19, wherein said first filtrate outlet and said second filtrate outlet lead to a common tank.

21. The device according to claim 18, said pressure vessel being provided with inlet means for at least one medium for back-wash of said filter element from the filtrate channel through the filter medium to said pressure vessel, wherein said filtrate channel communicates with said inlet means for supplying a back-wash medium other than filtrate.

22. The device according to claim 21, wherein the back-wash medium is water.

23. The device according to claim 21, said pressure vessel being provided with outlet means for material deposited on said filter medium, wherein said pressure vessel and said outlet means are adapted for self drainage of material dissolved in said back-wash medium, and in that said deposit outlet means communicates with a collecting vessel.

24. The device according to claim 1, said pressure vessel being provided with gas inlet means for a gas medium for drying of material deposited on said filter medium, wherein said gas inlet means communicates with a tank.

25. A device according to claim 24, wherein said tank is a separator for separating gas medium from filtrate.

26. The device according to claim 24 or 25, having a closed system for circulating the gas medium.

27. The device according to claim 26, wherein said closed system includes the tank, the pressure vessel and a collecting vessel.

28. The device according to claim 27, wherein said closed system also includes a container for receiving unfiltered suspension discharged from the pressure vessel, said container communicating with said inlet means for suspension.

29. The device according to claim 26, wherein said closed system also includes a compressor in a conduit between the tank and the pressure vessel.

30. A device according to claim 18, having two pressure vessels wherein at least one of said first filtrate outlet and said second filtrate outlet lead to a common tank for separating gas medium and filtrate, and having deposit outlet means from said pressure vessels connected to a common collecting vessel for said material deposited on said filter medium.

31. The device according to claim 30, having a common container for receiving unfiltered suspension discharged from the pressure vessels, said container communicating with said suspension inlet means of both pressure vessels.

* * * * *